US005158333A

United States Patent [19]

Saville

[11] Patent Number: 5,158,333

[45] Date of Patent: Oct. 27, 1992

[54] ADJUSTABLE HINGE ASSEMBLY

[75] Inventor: David R. Saville, Chatham Green, United Kingdom

[73] Assignee: Ford Motor Company, Dearborn, Mich.

[21] Appl. No.: 624,019

[22] Filed: Dec. 7, 1990

[30] Foreign Application Priority Data

Dec. 12, 1989 [GB] United Kingdom ................ 8928081

[51] Int. Cl.[5] ........................ B62D 25/10; E05D 7/04

[52] U.S. Cl. ........................................ 296/76; 16/246; 16/238

[58] Field of Search ..................... 16/246, 238; 296/76

[56] References Cited

U.S. PATENT DOCUMENTS

| | | | |
|---|---|---|---|
| 4,893,863 | 1/1990 | Skonieczny et al. | 296/76 |
| 5,029,930 | 7/1991 | Ihrke et al. | 16/235 |

FOREIGN PATENT DOCUMENTS

| | | |
|---|---|---|
| 696416 | 9/1953 | United Kingdom . |
| 911559 | 11/1962 | United Kingdom . |
| 921567 | 3/1963 | United Kingdom . |
| 1467178 | 3/1977 | United Kingdom . |
| 2038927B | 8/1982 | United Kingdom . |

*Primary Examiner*—John Sipos
*Assistant Examiner*—Carmine Cuda
*Attorney, Agent, or Firm*—Daniel M. Stock; Roger L. May

[57] ABSTRACT

A hinge for a vehicle body closure component such as a deck lid has a hinge pin mounted on a bracket, which bracket can itself be moved up and down by a screw mechanism to provide a fine adjustment of the vertical position of the hinge pin. The screw mechanism is accessible from outside the vehicle at the required stage of assembly so that the mechanism can be operated to provide the correct panel fit.

2 Claims, 1 Drawing Sheet

ADJUSTABLE HINGE ASSEMBLY

BACKGROUND OF THE INVENTION

1. Field of the Invention

This invention relates to an adjustable hinge assembly suitable for mounting a body closure component to a vehicle body. For example, the hinge can be used to mount a deck lid to a vehicle body.

2. Disclosure Information

In mounting hinged body closure components to a motor vehicle body, it is necessary to carefully control the gap between the outer surface of the closure component and the outer surface of the adjacent body panels. It is known to provide one or both of the hinge leaves with elongated holes so that the position of the body closure component can be finely adjusted before bolts, which pass through the elongated holes, are tightened. However, it is usually difficult to obtain access to these bolts because they will normally be concealed beneath the closure component which they mount.

SUMMARY OF THE INVENTION

According to the present invention, there is provided a hinge assembly comprising a pivot plate, a hinge arm pivoted to the pivot plate, a threaded nut fixed to the pivot plate and a threaded bolt which is rotatable but captive in a base member and which passes through the threaded nut so that rotation of the bolt moves the pivot plate along the axis of the bolt.

According to a second embodiment, there is provided a motor vehicle having a deck lid attached to the vehicle by means of a hinge assembly as set forth above, wherein the hinge arms are secured to the underside of the deck lid and the base members are mounted on a parcel shelf framework in the passenger compartment of the vehicle, with the threaded bolt having a bolt head which is accessible through the rear window opening, before the glass is put in place, in order that the up and down position of the pivot plate can be adjusted from outside the vehicle after the deck lid has been installed.

Preferably the base members are concealed by trim panels once the vehicle assembly has been completed.

BRIEF DESCRIPTION OF THE DRAWINGS

The invention will now be further described by way of example with reference to the accompanying drawing in which.

DETAILED DESCRIPTION OF THE PREFERRED EMBODIMENTS

Figure 1:
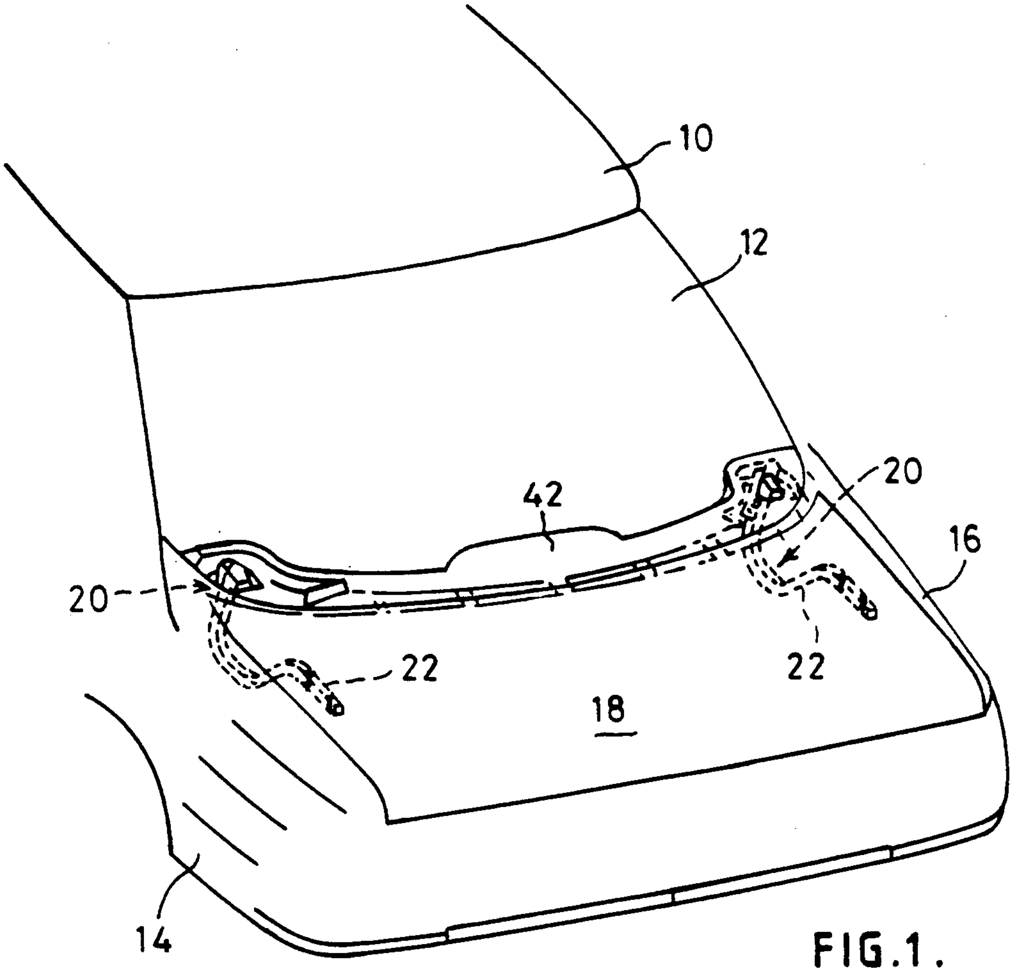
FIG. 1 is a schematic perspective view of the rear of a vehicle body.

The vehicle body as shown in FIG. 1 has a roof 10, a rear window aperture 12, rear fenders 14 and 16 and a deck lid 18. The deck lid is hinged to the body by hinge assemblies generally designated 20 so that the deck lid 18 can be hinged open.

Figure 2:
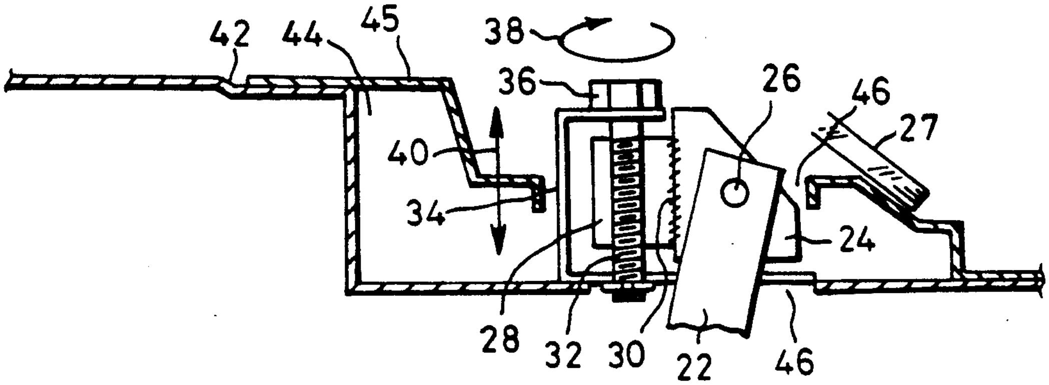
FIG. 2 is a vertical cross-section through the rear parcel shelf of the vehicle body shown in FIG. 1.

As can be seen in FIG. 2, each hinge assembly 20 consists of a swan-neck hinge arm 22 which has an outer end which can be bolted to the underside of the deck lid 18. The inner end of the arm 22 is pivoted to a pivot plate 24 on a pivot axis 26. When the deck lid 18 is opened and closed, the lid pivots about the axis 26.

When the lid is initially mounted on the arms 22 and is then put into a closed position the outer surface of the deck lid 18 skin panel may not be precisely flush with the surfaces of the adjacent body panels. In order to bring these surfaces flush, it is necessary to raise or lower the pivot axis 26. So as to allow this to be done, the pivot plate 24 has a threaded nut 28 welded to it at 30, and this nut is threaded onto a bolt 32. The bolt 32 is rotatable but captive in a base member 34. A bolt head 36 is accessible at the top of the base member and can be rotated as indicated by the arrow 38 to raise or lower the pivot plate 24 as indicated by another arrow 40.

Because the bolt head 36 is readily accessible at the top of a parcel shelf 42 inside the window opening 12 before the rear window glass 27 is installed, a tool can easily be placed on this bolt head and the height of the deck lid 18 relative to the surrounding bodywork can be easily adjusted.

FIG. 2 shows the parcel shelf 42 having a depression 44 to house the hinge 20 and an upper back panel 45. Apertures 46 are cut in the shelf and in the panel 45 to allow the hinge arm 22 to pass through and to accommodate the bottom end of the bolt 32. The base member 34 can be bolted or welded or otherwise fixedly secured to the top of the parcel shelf depression 44.

During a later stage of vehicle assembly, the parcel shelf assembly is preferably covered with a trim panel which will conceal the upper ends of the hinges.

This invention provides an easy and accurate way of adjusting the Panel fit of a hinged body closure component at a convenient stage during vehicle body assembly.

I claim:

1. A motor vehicle having a deck lid attached to the vehicle adjacent a parcel shelf frame work positioned interiorly of a rear window opening of the vehicle by means of a hinge assembly comprising a pivot plate, a hinge arm pivotably mounted to the pivot plate, a threaded not fixed to the pivot plate and a threaded bolt which is rotatable but captive in a base member and which passes through the threaded not so that rotation of the bolt alone moves and fixes the pivot plate along the axis of the bolt wherein the hinge arm is secured to the underside of the deck lid and the base member is mounted on the parcel shelf framework with the threaded bolt having a bolt head which is accessible through the rear window opening, before the glass is put in place, in order that the up and down position of the pivot plate can be adjusted from outside the vehicle after the deck lid has been installed.

2. A motor vehicle as claimed in claim 1, wherein the base member is concealed by trim panels once the vehicle assembly has been completed.

* * * * *